R. E. HELLMUND.
DYNAMO ELECTRIC MACHINE AND SYSTEM OF CONTROL THEREFOR.
APPLICATION FILED NOV. 19, 1917.
1,379,406.
Patented May 24, 1921.
4 SHEETS—SHEET 1.
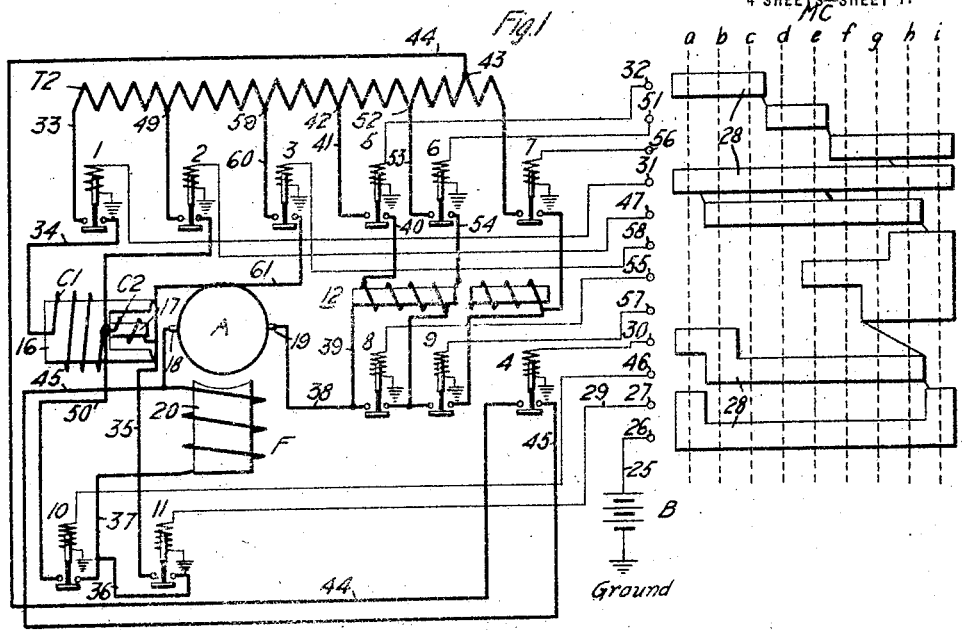
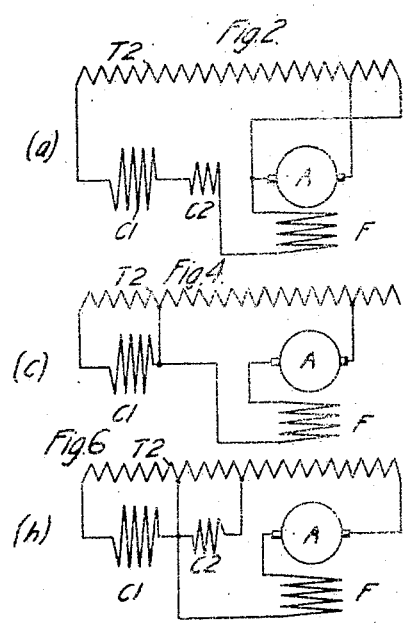
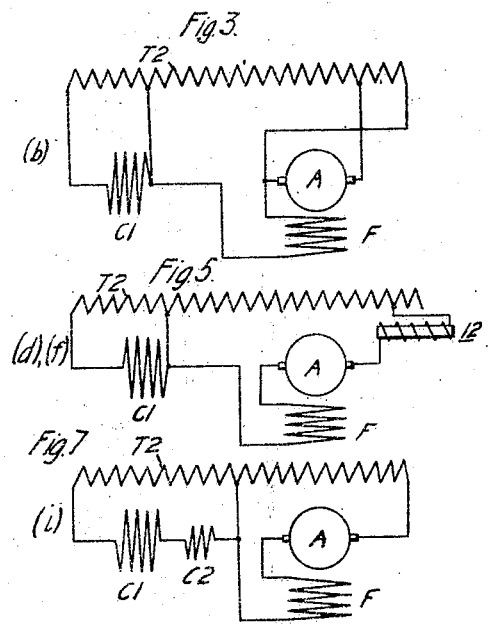
WITNESSES:
J. T. Wurmb
W. R. Coley
INVENTOR
Rudolf E. Hellmund
BY
Wesley G. Carr
ATTORNEY

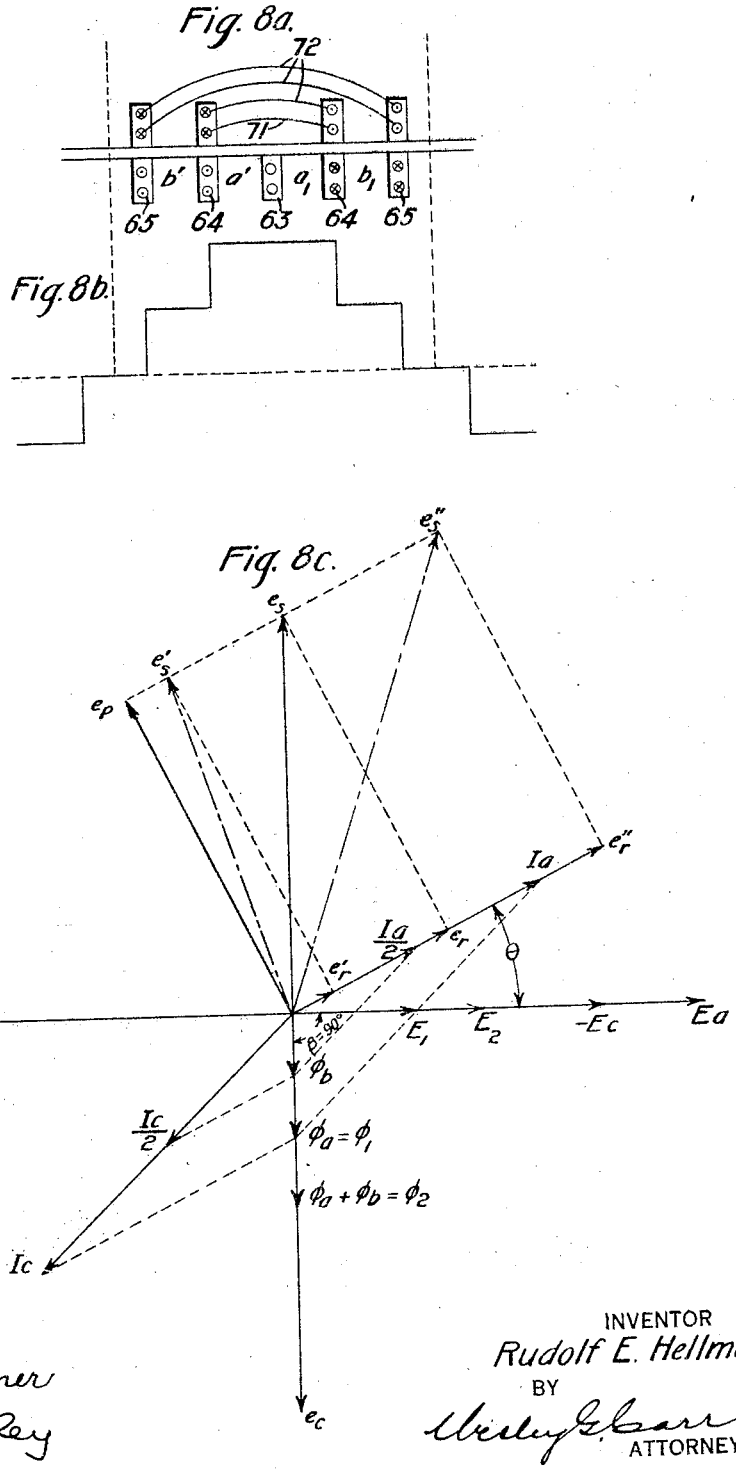

R. E. HELLMUND.
DYNAMO ELECTRIC MACHINE AND SYSTEM OF CONTROL THEREFOR.
APPLICATION FILED NOV. 19, 1917.
1,379,406.
Patented May 24, 1921.
4 SHEETS—SHEET 3.
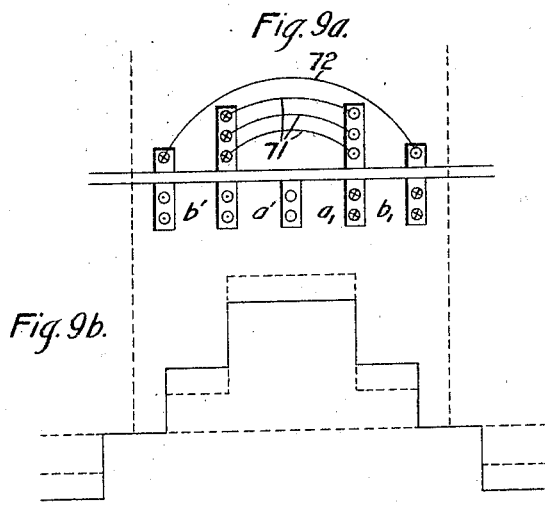
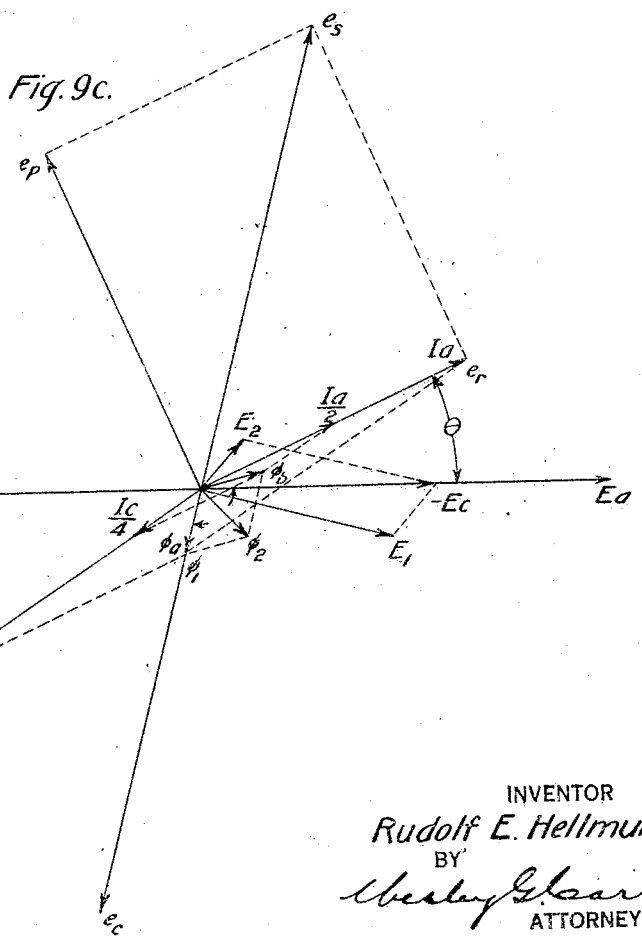
WITNESSES:
INVENTOR
Rudolf E. Hellmund
BY
ATTORNEY R. E. HELLMUND.
DYNAMO ELECTRIC MACHINE AND SYSTEM OF CONTROL THEREFOR.
APPLICATION FILED NOV. 19, 1917.
1,379,406.
Patented May 24, 1921.
4 SHEETS—SHEET 4.
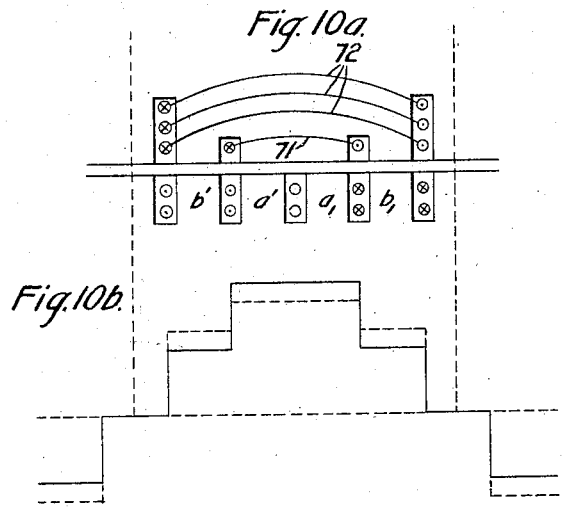
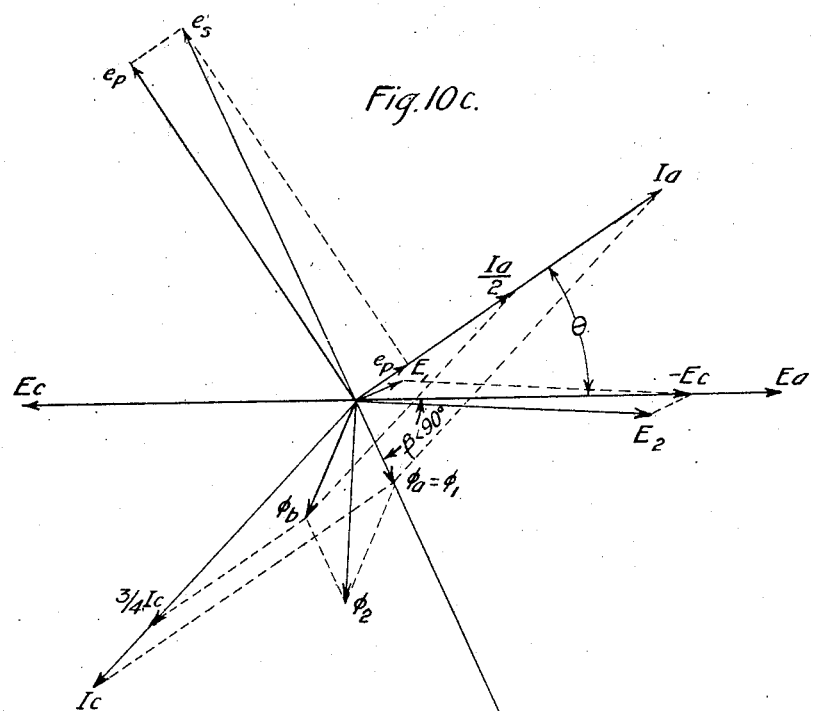
WITNESSES:
H. J. Shelhamer
W. R. Coley
INVENTOR
Rudolf E. Hellmund
BY
Charley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE AND SYSTEM OF CONTROL THEREFOR.

1,379,406.   Specification of Letters Patent.   Patented May 24, 1921.

Application filed November 19, 1917. Serial No. 202,700.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Dynamo-Electric Machines and Systems of Control Therefor, of which the following is a specification.

My invention relates to dynamo-electric machines and to systems of control therefor and especially to single-phase commutator motors of the doubly-fed or transformer-conduction type.

It is a well-known fact that the provision of an inducing field winding, having its magnetizing axis in substantial alinement with the electrical armature-winding position that corresponds to the armature brushes of a single-phase commutator motor, for the most part neutralizes the cross-magnetizing action of the armature-winding turns. In addition, the inducing field winding sets up a cross flux, shifted about 90° in time against the impressed voltage of the inducing field winding, thus preventing injurious sparking by reason of the fact that the electromotive force induced in the armature turns that are short-circuited by the brushes by the transformer action of the exciting field flux is substantially in time-phase opposition to the electromotive force that is induced by rotation of such short-circuited armature turns through the flux created by the inducing field winding.

While the inducing field winding, broadly considered, produces the above-mentioned neutralizing action, it is found, in actual operation that, when doubly-fed or transformer-conduction motors are running at a relatively low speed, poor commutating conditions obtain, since, by reason of the customary practice of making the field-form of the inducing field winding and of the demagnetizing armature ampere-turns substantially alike, the compensating or neutralizing voltage produced by the inducing field winding is, in reality, out of phase with the resultant electromotive force that is set up within the short-circuited armature-winding turns by the transformer action of the exciting field flux and by the small rotational reactance voltage. Furthermore, when a motor of the type under consideration is operating at relatively high speeds, the rotational reactance voltage that is self-induced in the short-circuited armature turns, which then attains a relatively high value, in combination with the short-circuit or transformer-action voltage, produces a resultant voltage which is again out of phase with the compensating voltage that is induced by the customary inducing field winding. This is explained more in detail in a series of articles entitled "Single-phase commutator motors" in the "*Electric Journal*" for 1912 by R. E. Hellmund and E. W. P. Smith.

It is the object of my present invention, therefore, to provide a novel inducing-field-winding arrangement whereby the above-mentioned out-of-phase relations of the armature demagnetizing voltage and the neutralizing voltage of the inducing field winding shall be eliminated, and substantial time-phase opposition of the two voltages shall obtain over a wide range of speed, whereby continually satisfactory commutating conditions may be secured.

More specifically stated, it is the object of my invention to provide a single-phase commutator motor with a double or plural-section inducing field winding, the arrangement of parts being such that one of the sections, acting alone, produces a field-form somewhat flatter than that of the armature demagnetizing turns, while the combined or superimposed effect of the inducing-field-winding sections will provide a more pointed or peaked field-form than such armature turns. In this way, I have found that the compensating voltage and the armature-reactance voltage that it is desired to neutralize, are maintained in substantial time-phase opposition throughout a wide speed range of the transformer conduction motor.

My invention may best be understood by reference to the accompanying drawing, wherein Figure 1 is a diagrammatic view of a single-phase commutator motor together with a control system embodying the principles of the present invention; Fig. 2 to Fig. 7 inclusive, are simplified diagrammatic views of main-circuit connections that may be employed to achieve the above-mentioned advantages of my invention; and Figs.

8 to 10 are vector-diagrams illustrating the working principles of the invention.

Referring to Fig. 1 of the drawing, the system shown comprises a single-phase commutator motor having an armature A, of the well-known commutator type; a main or exciting field winding F and an inducing or compensating field winding that embodies two sections C1 and C2. The motor is energized from any suitable source, such as the secondary winding T2 of an appropriate transformer, and I also provide a plurality of unit switches 1 to 11, inclusive, that are electrically energized in the desired sequence from a battery B, or the like, in accordance with the movements of a multi-position master controller MC. Preferably, a preventive coil 12, or the equivalent, is provided, in accordance with a familiar practice, to prevent the short-circuit of portions of the transformer winding during the operation of the motor.

The inducing-field-winding section C1 is shown as wound around a laminated polar projection 16, or the equivalent, that is provided, in the end-portion adjacent to the armature, with a plurality of longitudinally-extending slots, whereby an intermediate arm or small polar projection 17 is obtained, upon which the remaining inducing-field-winding section C2 is wound, being connected in series relation with the chief inducing-field-winding section C1. The illustrated design and arrangement of parts is provided to produce a relatively flat field-form if the field-winding-section C1 alone is employed, whereas the combined use of the sections C1 and C2 will produce a rather peaked or pointed field form, as will be understood from the ilustrated location of the section C2, as well as from the subsequent explanation of Figs. 8 to 10. However, it will be appreciated that any other suitable construction for providing the desired combination or superimposition of field-forms may be utilized within the spirit of the present invention: in actual practice, I employ the distributed type of stator windings that is customary in single-phase commutator motors.

The armature A is provided with two sets of brushes 18 and 19 that are spaced apart by a distance corresponding to 180 electrical degrees, and the axis of the inducing polar projection 16, including the smaller polar projection 17, is shown as located substantially in alinement with the armature brushes 18 and 19, as is customary. The main or exciting field winding F is wound upon a polar projection 20, or the equivalent, the magnetizing axis of which is shown as located substantially at right angles to the line of the armature brushes, as is usual practice.

Assuming that it is desired to effect acceleration of the illustrated motor, the master controller MC may be actuated to its initial position $a$, whereupon one circuit is established from the positive terminal of the battery B, through conductor 25, control fingers 26 and 27, which are bridged by contact segment 28 of the master controller, conductor 29, and the actuating coil of the switch 11, to ground or other suitable return conductor, whence circuit is completed to the negative terminal of the battery B.

The control fingers 30, 31 and 32 of the master controller are also energized in position $a$ thereof, whereby the switches 4, 1 and 5 are likewise closed.

The initial main-circuit connections are established from the left-hand terminal of the transformer winding T2 through conductor 33, switch 1, conductor 34, series-related inducing-field-winding sections C1 and C2, conductor 35, switch 11, conductors 36 and 37, exciting field winding F, armature A, conductors 38, 39 and 40, switch 5, and conductor 41 to an intermediate tap-point 42 of the transformer winding T2. A further main circuit is established from another intermediate transformer-tap 43 through conductor 44, switch 4 and conductor 45 to the junction-point of the armature A with the exciting field winding F. The starting main-circuit connections, corresponding to position $a$ of the master controller, are illustrated in a simplified manner in Fig. 2, whereby it will be observed that, initially, the entire inducing field winding and the exciting field winding are connected in series relation with the armature A, which is close-circuited through a relatively small outer section of the transformer winding, the armature connections being made in such manner that a reversed voltage is applied from the outer transformer section to the armature terminals. The motor is thus started in accordance with the familiar reversed "doubly-fed" or "transformer-conduction" connection.

It has been found that the circuit inclusion of the small inducing-field-winding section C2 affords advantageous operating conditions at the moment of starting, and, consequently, the section C2 is initially employed but is excluded from circuit as soon as the master controller is moved to its second position $b$, whereby the low-speed operating range of the motor is, in reality, begun, using the chief inducing-field-winding section C1 alone.

Such movement of the master controller to its position $b$ effects the energization of new control fingers 46 and 47, while the control finger 27 becomes disengaged from the contact segment 28. In this way, switches 10 and 2 are closed, while switch 11 is opened. Consequently, an intermediate point 49 in the left-hand half of the transformer winding T2 is connected, through switch 2, to the inner terminal of the chief inducing-field-winding section C1, which terminal is further connected, through conductor 50 and switch 10, to conductor 37 and the exciting field winding F. The familiar doubly-fed or transformer-conduction connection is thus established, the inducing-field-winding section C1 being directly connected across a small portion of the transformer winding T2, while the smaller inducing-field-winding section C2 is entirely excluded from circuit, as illustrated in Fig. 3.

Upon actuation of the master controller to position c, control finger 30 becomes disengaged from contact segment 28, whereby switch 4 is opened to remove the initial reversed transformer-conduction type of connection from the armature A and complete a straight transformer-conduction connection, as illustrated in Fig. 4.

In position d, the contact segment 28 engages control finger 51 to close the switch 6, while the switch 5 is opened by reason of the deënergization of its corresponding control finger 32. Consequently, a new circuit is established from a tap-point 52 in the right-hand half of the transformer winding, through conductor 53, switch 6, conductor 54, the left-hand section of the preventive coil 12, and thence, through conductors 39 and 38, to the armature A, as previously described. In this way, an increased voltage from the transformer winding T2 is conductively impressed upon the armature brushes, although the value of the increased voltage step is reduced by the interposition of a section of the preventive coil 12. The simplified connections, corresponding to position d, are shown in Fig. 5.

In position e, control finger 55 is energized from the contact segment 28, whereby the switch 8 is closed to short-circuit the active portion of the preventive device 12 and thus effect the impression of a certain voltage increase upon the armature terminals to further accelerate the motor.

Position f of the master controller effects the energization of a new control finger 56 to close switch 7 and the deënergization of control finger 51 to open switch 6. Consequently, a new main circuit is completed from the right-hand terminal of the transformer winding T2 through switch 7, the right-hand section of the preventive coil 12 and thence, through switch 8 and conductor 38 to the armature. A set of connections, analogous to those effected in position d of the master controller and illustrated in Fig. 5, are thus produced to impress a further step of voltage upon the armature terminals.

In position g, a new control finger 57 is energized to close the switch 9, whereby the active section of the preventive coil 12 is short-circuited and the armature voltage is further increased.

By this time, the flat field-form produced by the inducing-field-winding section C1 alone has about reached the limit of its usefulness in preventing phase difference between the compensating field voltage and the armature-reactance voltage, and, consequently, the change to the use of both inducing-field-winding sections C1 and C2, to produce the desired phase relations under high-speed operation, is effected, beginning with position h of the master controller. In this position, control finger 58 is energized from the contact segment 28, whereby switch 3 is closed to establish a new main circuit from an intermediate transformer tap-point 59, through conductor 60, switch 3, and conductor 61, to the inner terminal of the small inducing-field-winding section C2, as illustrated in Fig. 6, wherein the inducing-field-winding sections C1 and C2 are connected across contiguous portions of the transformer winding, and a predetermined effect upon the inducing field-form is produced, dependent upon the value of voltage that is impressed upon the section C2 from the transformer winding T2.

In the final master-controller position i, control finger 27 is again energized, while control fingers 46 and 47 are deënergized. In this way, switch 11 is again closed, while switches 10 and 2 are opened. The substitution of switch 11 for switch 10 changes the connection of the lower exciting-field-winding terminal from a point intermediate the inducing-field-winding sections C1 and C2 to the inner terminal of the small section C2, while the opening of switch 2 removes the connection between the transformer and the junction-point of the inducing-field-winding sections C1 and C2, which are thus included in a straight series circuit across a predetermined portion of the transformer winding T2, as illustrated in Fig. 7. The final circuit arrangement just recited produces the desired pointed or peaked effect in the inducing field-winding field-form, whereby the previously-mentioned desired correction of phase relations is produced under high-speed operating conditions of the motor. The influence of the changed field form upon the phase relation of the voltages in the short-circuited armature coil may be further explained in connection with Figs. 8a to 10c. Figs. 8a to 8c illustrate the familiar case, in which the field forms of the armature and that of the inducing field winding are alike. It is assumed that the armature conductors 63, 64 and 65 of an inducing-field-winding pole are, as usual, evenly distributed between the neutral points of the inducing field winding indicated by dotted lines. The conductors 63, located in the neutral of the main field, are parts of the coils short-circuited by the brushes and thus they carry no working currents. The latter, flowing in the remaining conductors 64 and 65, tend to set up an armature cross field as shown by the step form in Fig. 8b. If now the inducing field winding is arranged as also shown in Fig. 8a, with coils 71 and 72 distributed the same as the active armature conductors, it is evident that these coils will produce the same field form.

Referring now to the vector diagram of Fig. 8c, we have an armature-circuit voltage E$a$ and a current I$a$ lagging the usual angle $\Theta$ behind the voltage in time. The inducing-field-winding current I$c$ is, with regard to its magnetizing effect, substantially in opposition to I$a$, but sufficiently shifted to give, when vectorially combined with I$a$, a vector $\varphi_a$, representing the resultant magnetizing effect and, therefore, also the flux in the teeth $a'$ $a_1$, which are under the influence of all conductors of both windings. The teeth $b'$ $b_1$, are under the influence of half the turns of each winding; thus their flux $\varphi_b$ may be represented by a vector $\varphi_b$, obtained by combining the vectors $(\frac{1}{2})$I$a$ and $(\frac{1}{2})$I$c$. The flux interlinking with the inducing field coils 71 is the same as $\varphi_a$. The flux interlinking with coils 72 is the sum of $\varphi_a$ and $\varphi_b$ as shown by vector $\varphi_2$. The flux $\varphi_1$ interlinking with the turns 71 induces a counter E. M. F., E$_1$ therein, lagging 90° behind the flux; similarly $\varphi_2$ induces E$_2$ in coils 72. The sum, $-$E$c$, of E$_1$ and E$_2$ gives the total counter electro-motive force of the inducing field winding and must be equal and opposite to the impressed voltage E$c$. Since the latter is taken from the same transformer as E$a$, the two must be in line with each other, as shown.

With regard to the commutating voltages, it is known that the pulsations of the exciting flux induce a voltage $e_p$ at right angles to the current I$a$, and that the reactance voltage $e_r$ is in phase with I$a$. The two combine to produce $e_s$, while the inducing-field-flux $\varphi_a$ in the commutating zone induces by rotation a voltage $e_c$. With the phase angle $\Theta$ shown and the reactance voltage $e_r$ being assumed about half as large as the pulsating voltage $e_p$, it follows that $e_c$ and $e_s$ are equal and opposite to each other. We thus have ideal neutralizing conditions under the assumption made and applying to medium-speed operation. It is at once evident, however, that with low-speed operation, giving small values for the reactance voltage, as, for instance, indicated by vector $e'_r$, an inducing-field voltage of the phase $e_c$ can never give full neutralization of $e'_s$. Similarly, at high-speed operation, giving large reactance voltages as, for instance, $e''_r$, it is impossible for a voltage $e_c$ to neutralize $e''_s$.

Figs. 9a to 9c demonstrate, however, that under such high-speed conditions, with a large value of $e_r$, ideal compensation is possible, if the inducing field is chosen more peaked than the armature field. Fig. 9a shows the new winding arrangement, with a single turn 72 in the outer inducing field-winding slots and three turns 71 in the inner slots. In Fig. 9b the armature field form is shown as in Fig. 8a, but the inducing field form, indicated by the dotted line, is more peaked in the middle, with the new arrangement. The vector diagram is derived the same as Fig. 8c. The flux $\varphi_a$ is again the resultant of I$a$ and I$c$, since it is induced by the full number of turns. It is to be noted, however, that the flux $\varphi^b$ in the teeth $b'$ $b_1$, is induced by one-half the armature ampere-turns $(\frac{1}{2})$I$a$ and one-quarter the inducing field turns $(\frac{1}{4})$I$c$; the two combine to produce $\varphi_b$, which is, in contra-distinction to Fig. 8c, out of phase with $\varphi_a$. The flux $\varphi_1$ interlinking with coils 71 is again the same as $\varphi_a$, while $\varphi_2$ is again found as the geometrical sum of $\varphi_a$ and $\varphi_b$. In deriving the voltages E$_1$ and E$_2$ at right angles to $\varphi_1$ and $\varphi_2$, the fact that the inner coils 72 have three times the turns of the outer coil 71 has been considered. An inspection of the vectors $e_r$, $e_p$, and $e_s$ and $e_c$, the latter being in phase with $\varphi_a$, shows that ideal neutralization is obtained in spite of the large value of $e_r$ caused by the high-speed operation.

Fig. 10c shows that similarly it is possible to obtain good results with small values of $e_r$ incident to low speed operation, if the inducing field winding is arranged as in Fig. 10a to give a flat field form, as illustrated in Fig. 10b.

While rather simple assumptions have been made for the purpose of illustration, the general tendency applies to the practical case having a larger number of slots. It is thus evident that good all-around conditions can be obtained by using a flat inducing field form for low speed and introducing means for modifying the field form to be more peaked at higher speeds, as disclosed in connection with Fig. 1.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The method of operating a single phase commutator machine for the prevention of sparking, which consists in producing, in the brush axis at the instant of starting, a field flux having a pointed field-form, and in producing, in the brush axis during low-speed running conditions, a field flux having a less pointed field-form.

2. The method of operating a single phase commutator machine so as to eliminate sparking, which consists in producing a compensating field flux having a flat field-form, during relatively low-speed operation, and in producing a compensating field flux having a pointed field-form, during relatively high-speed operation.

3. The combination with a single-phase commutator machine having an inducing field-winding, of means for manipulating the connections of said inducing field winding to provide a field-form that is flatter than that of the demagnetizing armature turns under certain speed conditions of the machine and more pointed under other speed conditions.

4. The combination with a single-phase commutator motor having an inducing field-winding, of means for manipulating the connections of said inducing field winding to provide a field-form that is flatter than that of the cross-magnetizing armature turns under certain low-speed conditions of the motor and more pointed under high-speed conditions.

5. The method of operating a single-phase commutator motor having a plurality of inducing-field-winding sections having different positions in space around the circumference of the field member, which consists in connecting one of asid sections in circuit during certain low-speed motor operation and in connecting all of said sections in circuit during high-speed motor operation.

6. The combination with a single-phase commutator motor having a plurality of inducing-field-winding sections that are respectively adapted to produce a relatively flat field-form and a pointed field-form, of means for connecting the flat-field-form section in circuit alone during a certain speed range and for connecting both sections in circuit during another speed range to improve commutating conditions.

7. The combination with a single-phase commutator motor having a plurality of inducing-field-winding sections that are respectively adapted to produce a relatively flat field-form and a pointed field-form, of means for connecting said sections to produce the flat field-form under certain low-speed motor operation and to superimpose the pointed field-form upon the flat field-form under high-speed motor operation.

8. A single-phase commutator machine having a plurality of inducing-field-winding sections, said sections being differently distributed around the circumference of the field member, and means for connecting one of said sections in circuit during a certain condition of machine operation and for connecting all of said sections in circuit during a different condition of machine operation.

9. The method of operating a single-phase motor comprising armature working conductors and exciting conductors and a field winding in an axis different from the exciting axis that consists in localizing the flux produced by said field winding under certain operating conditions and distributing such flux over a wider area under other operating conditions.

In testimony whereof, I have hereunto subscribed my name this 31st day of Oct., 1917.

RUDOLF E. HELLMUND.